United States Patent
Eklund

(10) Patent No.: US 7,921,350 B2
(45) Date of Patent: Apr. 5, 2011

(54) SYSTEM AND METHOD FOR FAULT DETECTION AND LOCALIZATION IN TIME SERIES AND SPATIAL DATA

(75) Inventor: Neil Holger White Eklund, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1065 days.

(21) Appl. No.: 11/682,025

(22) Filed: Mar. 5, 2007

(65) Prior Publication Data
US 2008/0219336 A1    Sep. 11, 2008

(51) Int. Cl.
*H03M 13/00* (2006.01)
(52) U.S. Cl. ............................ 714/776; 714/765; 714/48
(58) Field of Classification Search .................. 714/776, 714/764, 765, 48, 49, 39
See application file for complete search history.

(56) References Cited

U.S. PATENT DOCUMENTS

| | | | | |
|---|---|---|---|---|
| 5,761,090 A | * | 6/1998 | Gross et al. | 714/26 |
| 5,790,513 A | * | 8/1998 | Hiroki et al. | 369/275.2 |
| 6,954,721 B2 | * | 10/2005 | Webber | 702/189 |
| 6,975,962 B2 | * | 12/2005 | Wegerich et al. | 702/182 |

OTHER PUBLICATIONS

Bartlett, M. (1963). "Statistical estimation of density functions", Sankhya, Series A 25: 245-54.
Epanechnikov, V. (1969). "Nonparametric estimates of a multivariate probability density", Theory of Probability and its Applications 14: 153-8.
Nadaraya, N. (1964). "On estimating regression". Theory of Probability and its Applications. 10, 141-142.
Watson G. (1964). "Smooth Regression Analysis", Sankhia, Series A, 26, 359-372.

* cited by examiner

*Primary Examiner* — Fritz Alphonse
(74) *Attorney, Agent, or Firm* — Penny A. Clarke

(57) ABSTRACT

A method for fault detection and localization calls for obtaining a data set, smoothing the data set, identifying a plurality of split points within the data set, fitting a piecewise linear function to the plurality of split points; and determining a residual between the function and the smoothed data set. Related systems and computer program products are disclosed and claimed.

19 Claims, 13 Drawing Sheets

--- Epanechnikov
— Tri-cube
— Gaussian

♦ Raw Data
— Kernal Smooth

- ◆ Raw Data
- — Kernal Smooth
- --- Piecewise Linear Fit

- ◆ Raw Data Residual
- — Kernal Smooth Residuals
- ----- Next Split Point

- ◆ Raw Data
- — Kernal Smooth
- --- Piecewise Linear Fit

- ◆ Raw Data Residuals
- — Kernal Smooth Residuals
- ----- Next Split Point

- ◆ Raw Data
- ── Kernal Smooth
- --- Piecewise Linear Fit

- ◆ Raw Data Residuals
- ── Kernal Smooth Residuals
- ------ Next Split Point

- ◆ Raw Data
- —— Kernal Smooth
- --- Piecewise Linear Fit

- ◆ Raw Data Residuals
- —— Kernal Smooth Residuals
- ----- Next Split Point

- ♦ Raw Data
- —— Kernal Smooth
- --- Piecewise Linear Fit

- ♦ Raw Data Residuals
- —— Kernal Smooth Residuals

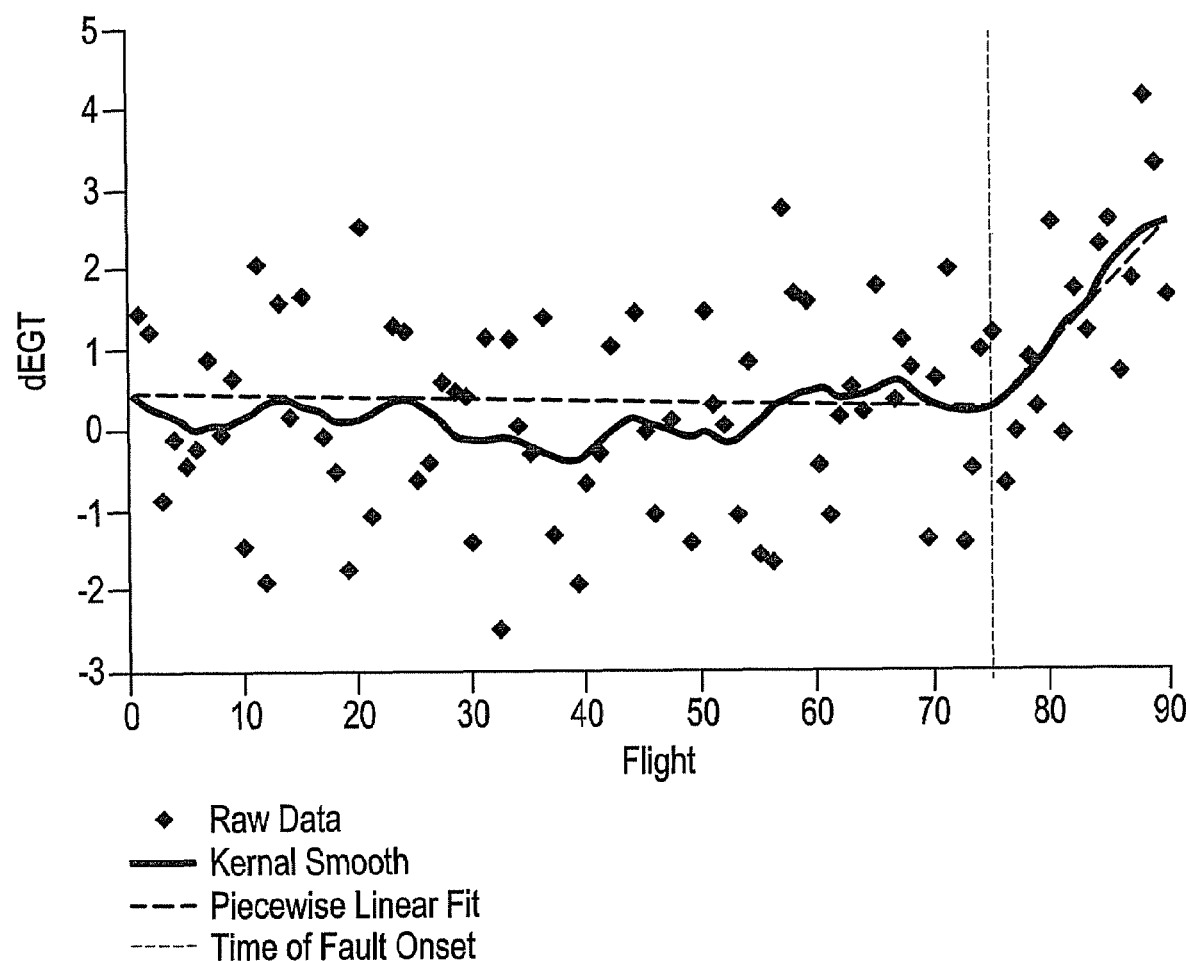

SYSTEM AND METHOD FOR FAULT DETECTION AND LOCALIZATION IN TIME SERIES AND SPATIAL DATA

BACKGROUND OF THE INVENTION

1. Field of the Invention

The teachings herein relate to system prognosis in general, and fault detection and localization in particular.

2. Description of the Related Art

Abnormal condition detection is an important first step in system prognosis. Abnormal conditions, also known as faults, are the first sign of a potential equipment failure at some future time. Detecting abnormal conditions implies, at the very least, detecting change in time series data from one or more sensors. Having detected that there has been a change, one often further desires to precisely locate the time of the change, (e.g., to allow in a manufacturing system the removal of defective units).

The direct cost of equipment failures is unavoidable: ultimately, the faulted component must be replaced. However, there are indirect costs to equipment failure that are in many cases far greater than the cost of the repair. One source of indirect costs is secondary damage (e.g., component failure in the compressor stage of a gas turbine might cause damage to the rear stages). Another indirect cost is unscheduled maintenance. It can be far less expensive to replace a faulty component before it has failed during scheduled maintenance than to have a component fail and have to shut the system down unexpectedly. In addition, guaranteed uptime is often written into service contracts.

Avoidance of unscheduled downtime and costly secondary damage make the accurate detection of faults and prediction of equipment remaining useful life of enormous economic benefit to industry. The detection of faults is an important first step in building a prognostic reasoning system. Thus, there is considerable motivation to detect faults early and accurately in many systems.

BRIEF DESCRIPTION OF THE INVENTION

The method presented here can be used to detect faults in time series or spatial data, and to localize the expected time of onset (necessary for system prognosis) of those faults to a narrow window.

The invention described herein provides an accurate method for fault detection and localization in time series or spatial data. The invention has been applied successfully to several data sets from different domains. A key feature of this invention is accuracy: it both indicates fewer spurious faults, and indicates the exact point of onset of faults more accurately than other prior art techniques examined.

In accordance with one embodiment of the present invention a method for fault detection and localization is provided. The method includes obtaining and smoothing a data set representing a time series or spatial data. The method identifies at least two split points (the first and last points in the time series, by definition) within the data set and makes a piecewise linear fit between the split points. Next, the method determines the residual (the difference between the smoothed value and the fit), and iteratively refits the function until the maximum absolute residual is below a domain-dependant predetermined threshold.

In accordance with another embodiment of the present invention a system for fault detection and localization is provided. The system includes a fault detection localization module for analyzing data. Analyzing the data includes smoothing the data, identifying split points within the data set, and fitting a piecewise linear function to the split points. The system also includes means for determining the residual between the function and the smoothed data. In addition the system has at least one electronic storage device for storing the data.

The invention is also directed towards a program storage device readable by a machine, tangibly embodying a program of instructions executable by the machine to perform a method for fault detection and localization. The method includes obtaining a data set; smoothing the data set; identifying a plurality of split points within the data set; and fitting a piecewise linear function to the plurality of split points. The method also includes determining the residual between the function and the smoothed data set and determining if any maximum absolute residual exceeds a domain dependant predetermined threshold. If the threshold is exceeded the method includes fitting a second piecewise linear function to the plurality of split points and determining the residuals between the second function and the smoothed data set. The method iteratively continues until the maximum absolute residual is below a domain dependant predetermined threshold.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 11-13 are graphs of an example of a possible realization of dEGT data at flight 75, flight 80, and flight 90, respectively.

DETAILED DESCRIPTION OF THE INVENTION

Figure 1:
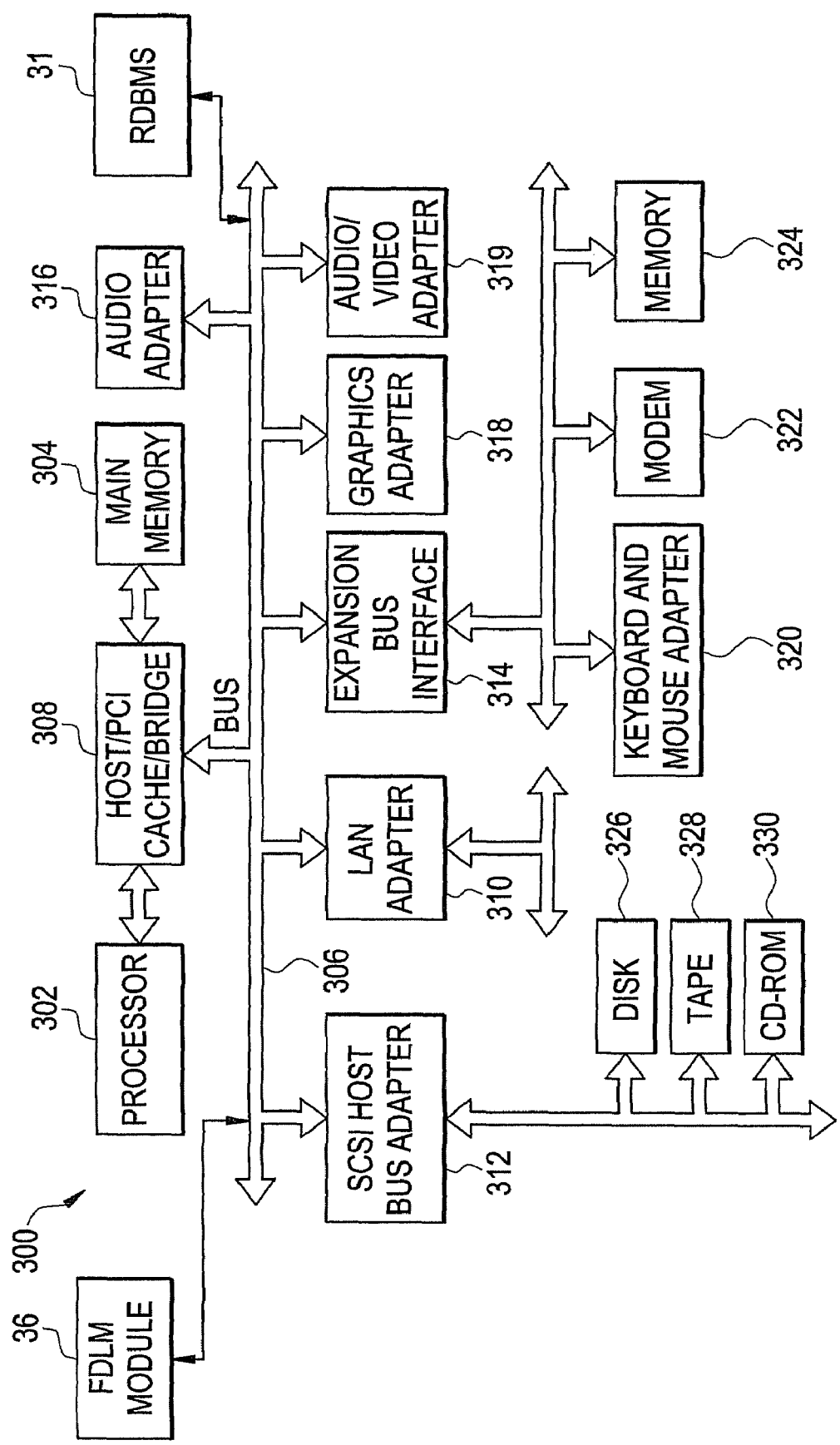
FIG. 1 is an exemplary diagram of a fault detection localization (FDL) system in accordance with an embodiment of the present invention.

With reference now to FIG. 1, a block diagram illustrating a fault detection and localization (FDL) system (i.e., a data processing system 300) 300 is depicted. The fault detection and localization (FDL) system 300 may be used for implementation of the teachings herein. In typical embodiments, the FDL system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the example depicted, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support PCI expansion slots or add-in connectors.

An operating system rums on processor 302 and is used to coordinate and provide control of various components within data processing system 300 in FIG. 1. The operating system may be any suitable commercially available operating system.

In addition, an object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Inputs to FDLM 36 define time series or spatial data as described herein. It will be appreciated that FDLM 36 may receive inputs via any suitable method. For example, inputs may be pre-sampled and stored in memory 324, stored on disk 326, or stored in relational database manager (RDBMS) 31, for later retrieval. Fault detection/localization module (FDLM) 36 receives user input via keyboard and/or mouse adapter 320.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1.

The example depicted in FIG. 1 and above-described examples are not meant to imply architectural limitations. For example, FDL system 300 may be a notebook computer or hand held computer in addition to (or in place of) taking the form of a PDA. In addition the FDL system 300 and FDLM module 36 may also include real time sensors such as, for example, accelerometers for measuring displacement, velocity, and acceleration; temperature sensors; vibration sensors; pressure sensors; and any other suitable real time sensor.

Figure 2:
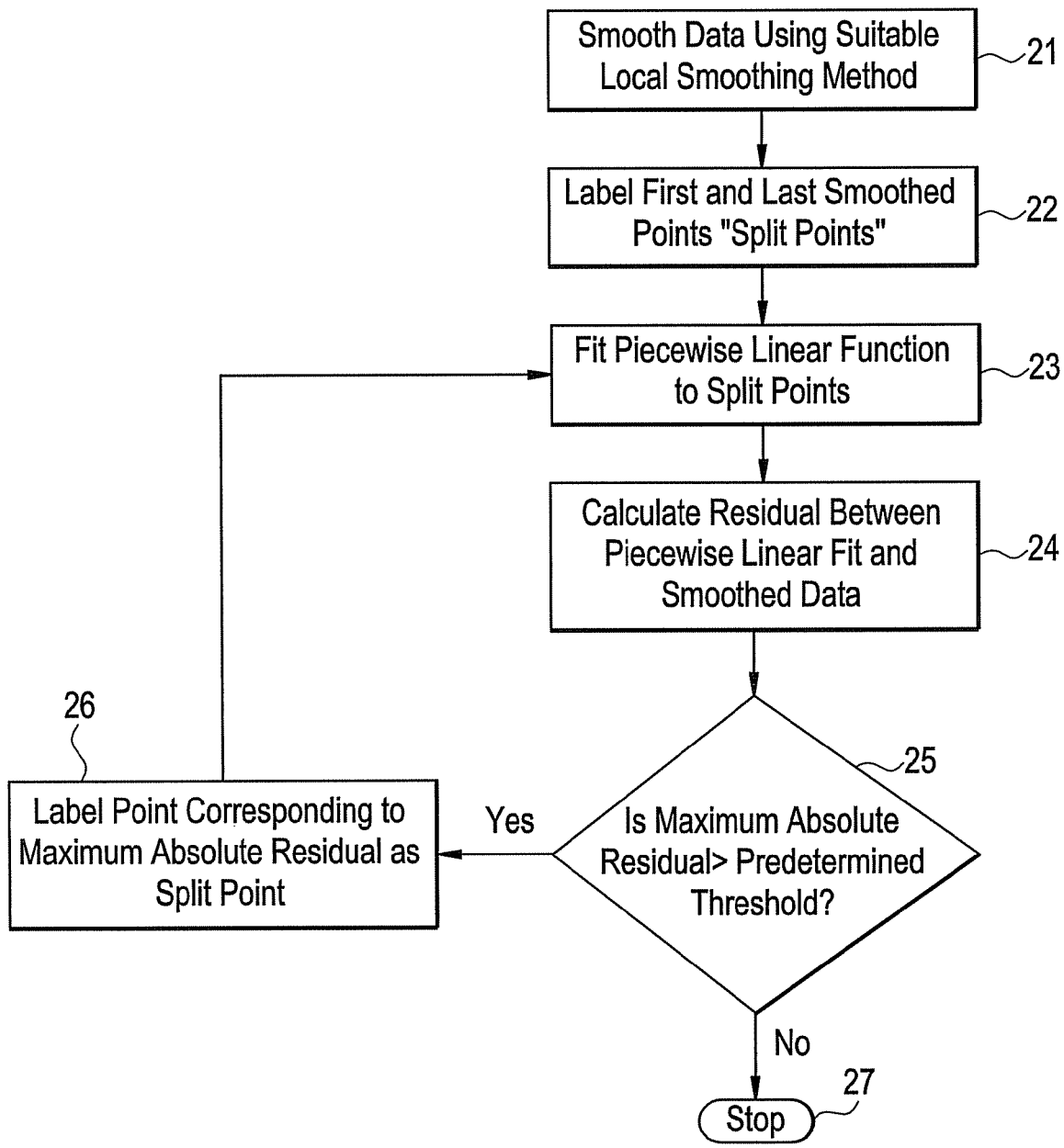
FIG. 2 is flowchart illustrating one method of the FDL feature shown in FIG. 1.

Referring also to FIG. 2, the Kernel Split Find (KSF) algorithm is a novel approach to identifying and localizing changes in time series or spatial data. An outline of method follows.

The Fault Detection Localization Module (FDLM) 36 smoothes 21 the data using Nadaraya-Watson regression. It will be appreciated that any suitable local regression or data smoothing algorithm may be used. Nadaraya-Watson regression is a kernel regression technique. With general regard to kernel regression, reference may be had to Nadaraya, N. (1964). "On Estimating Regression," Theory of Probability and its Applications. 10, 186-190; and Watson, G. (1964). "Smooth Regression Analysis," Sankhia, Series A, 26, 359-372.

Figure 3:
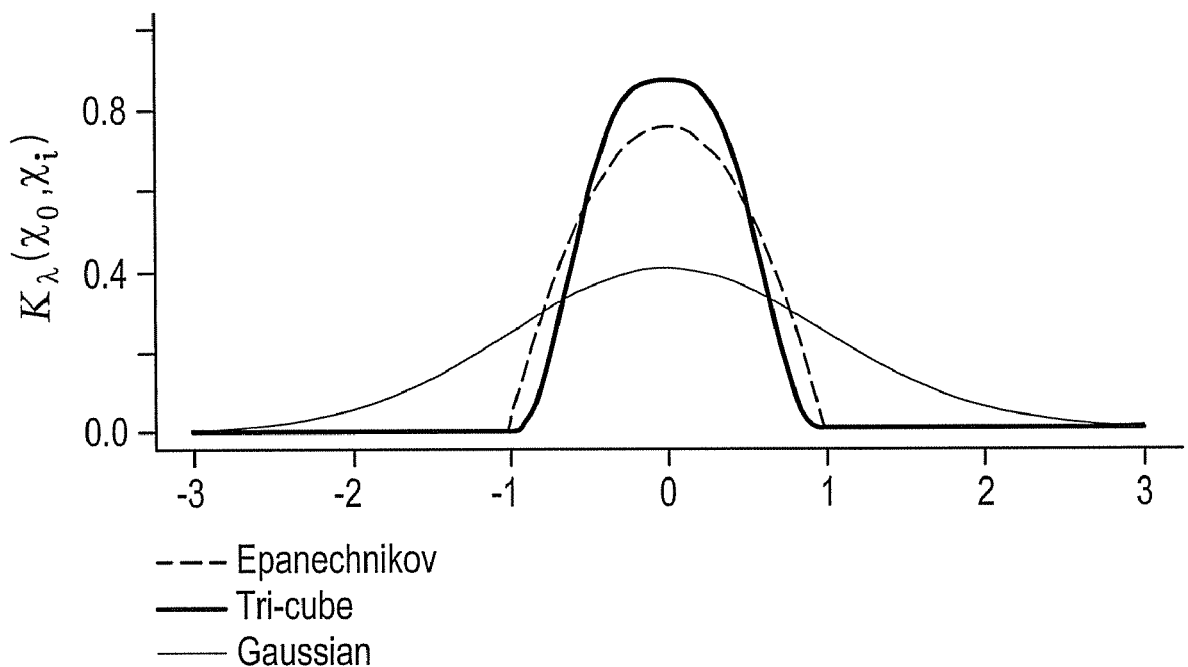
FIG. 3 is a graph showing sample kernel functions.

Kernel regression makes no assumptions about underlying functional form of the data, so results in low bias (i.e., it can easily represent any underlying function) but higher variance (i.e., the representation may change dramatically depending on data). For any point (e.g., time) $x_0$, the estimate of the value at $x_0$ is provided by Eq. 1:

$$\hat{f}(x) = \frac{\sum_{i=1}^{N} K_\lambda(x_0, x_i) y_i}{\sum_{i=1}^{N} K_\lambda(x_0, x_i)} \quad \text{(Eq. 1)}$$

where $K_\lambda$ can be any of a number of kernel functions (e.g., FIG. 3); N is the number of raw data points; i is an indexing function; and $y_i$ is the value of the data at $x_i$. An embodiment of the invention employs the Epanechnikov-Bartlett kernel (Epanechnikov, 1969; Bartlett, 1963), as provided in Eq. 2:

$$K_\lambda = \begin{cases} \frac{3}{4}\left(1 - \frac{(x_0 - x_i)^2}{\lambda}\right)^2 & \left|\frac{(x_0 - x_i)}{\lambda}\right| \leq 1 \\ 0 & \left|\frac{(x_0 - x_i)}{\lambda}\right| > 1 \end{cases} \quad \text{(Eq. 2)}$$

It will be appreciated that any suitable kernel might be used (e.g., tri-cube, Gaussian, etc.). Selection of the smoothing parameter, $\lambda$, in Eq. 1 is data-dependant, and can be accomplished by any suitable heuristic (e.g., cross-validation).

Figure 4:
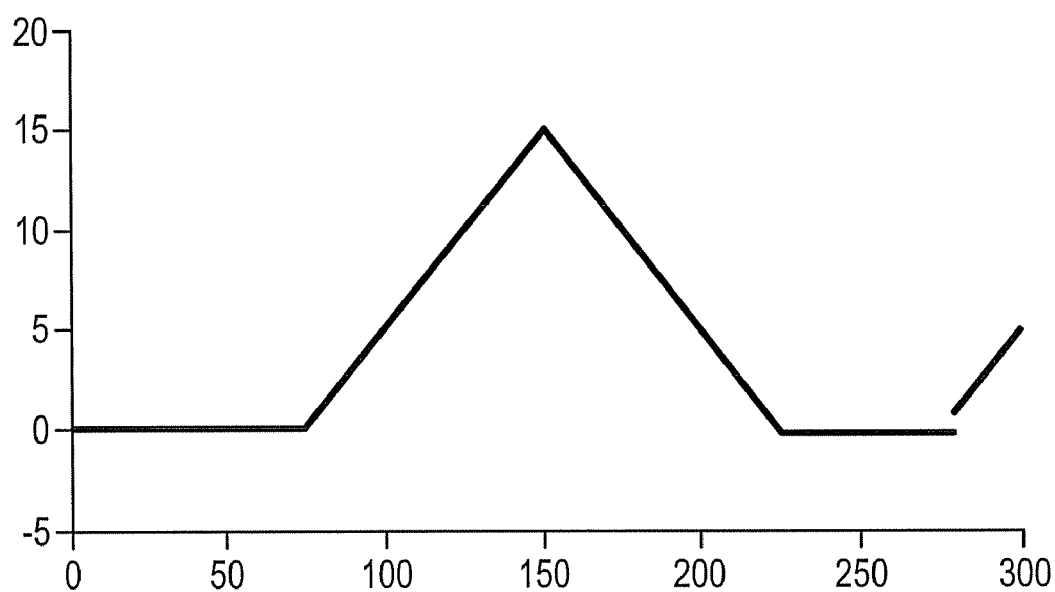
FIG. 4 is a graph showing the underlying function as used herein to demonstrate the method.
Figure 5:
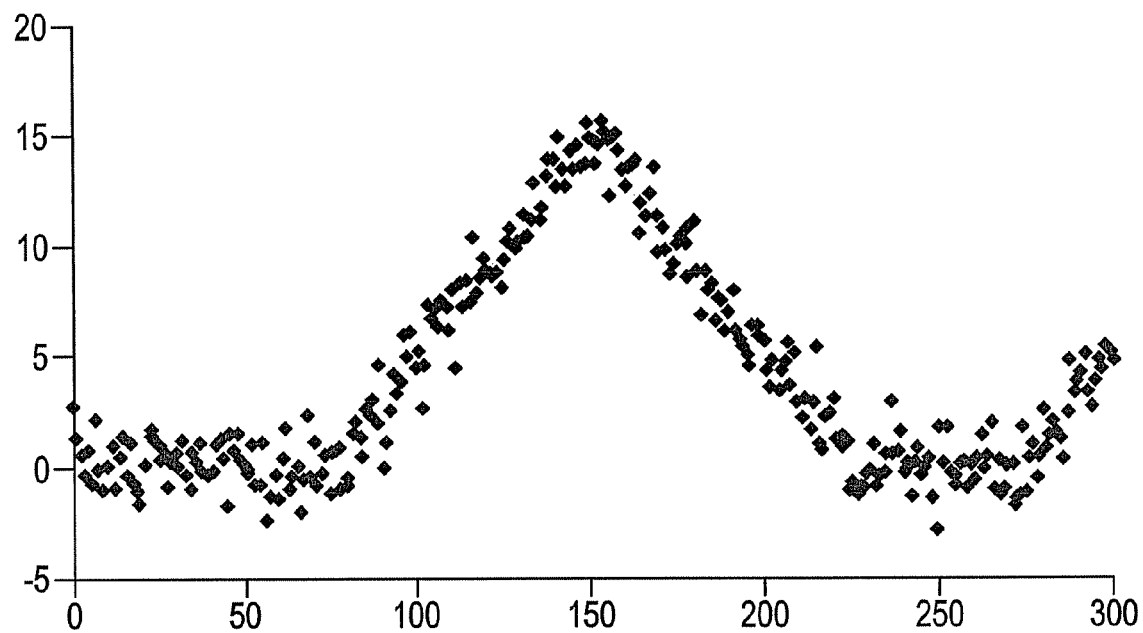
FIG. 5 is a graph showing data sampled from the underlying function shown in FIG. 4, plus a particular realization of random noise, wherein the data plus noise is refereed to herein as the "raw data"
Figure 6:
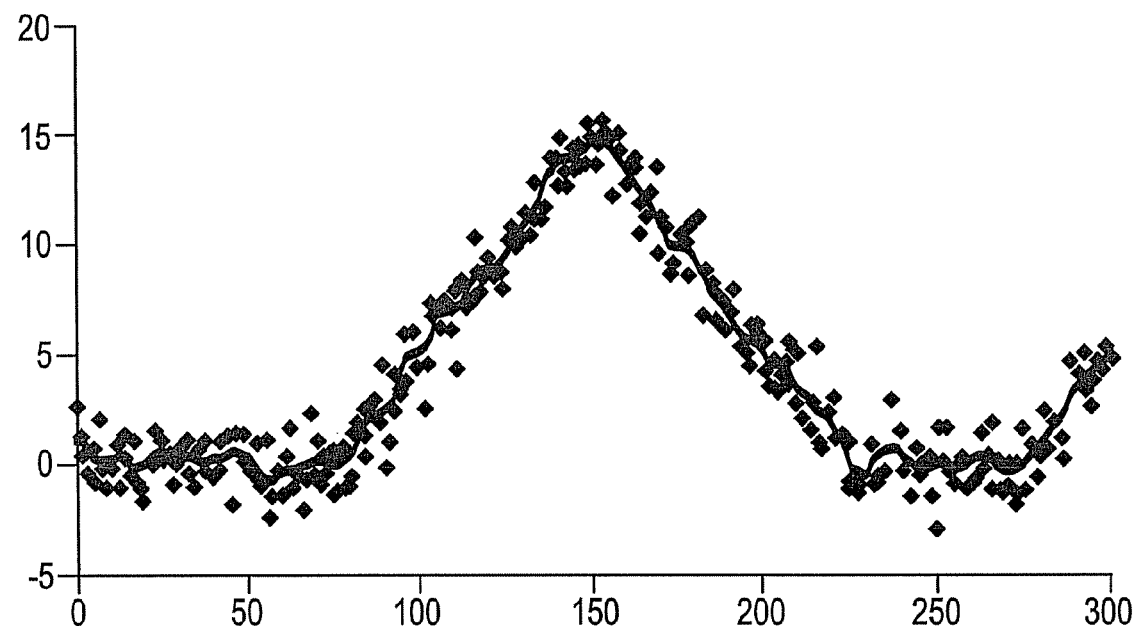
FIG. 6 is a graph showing the raw data and a kernel smooth of the data.

FIG. 4, FIG. 5, and FIG. 6 provide graphic examples of aspects of kernel regression in accordance with the teachings herein. FIG. 4 shows the underlying function used for a demonstration of this technique. FIG. 5 shows some points sampled from the underlying function with random Gaussian noise added; these points are referred to as the "raw data" below. FIG. 6 shows the raw data and a possible kernel smooth of the raw data (other smoothing parameters will produce different smoothes). It will be understood that this underlying function, this particular realization of the raw data, and this kernel smooth are examples used for the purpose of demonstration.

Continuing with FIG. 2, FDLM 36 labels 22 the first and last smoothed points "split points" and makes a piecewise linear fit 23 to the split points in time order (i.e., connecting regions between adjacent split points with line segments). The goal of the algorithm is to identify "split points" (i.e., points that identify where the system undergoes some change). The first and last points in a time series are by definition labeled split points: if the system undergoes no change, the entire series is one segment.

Next, the FDLM 36 determines 24 the residual between linear fit and smoothed data. If maximum absolute residual is greater than a predetermined threshold 25, FDLM 36 labels 26 the point corresponding to the maximum absolute residual as a split point and makes a piecewise linear fit 23 of all split points in time order. The use of the kernel smooth rather than the raw data to find split points makes the algorithm resistant to noise and outliers.

Figure 7:
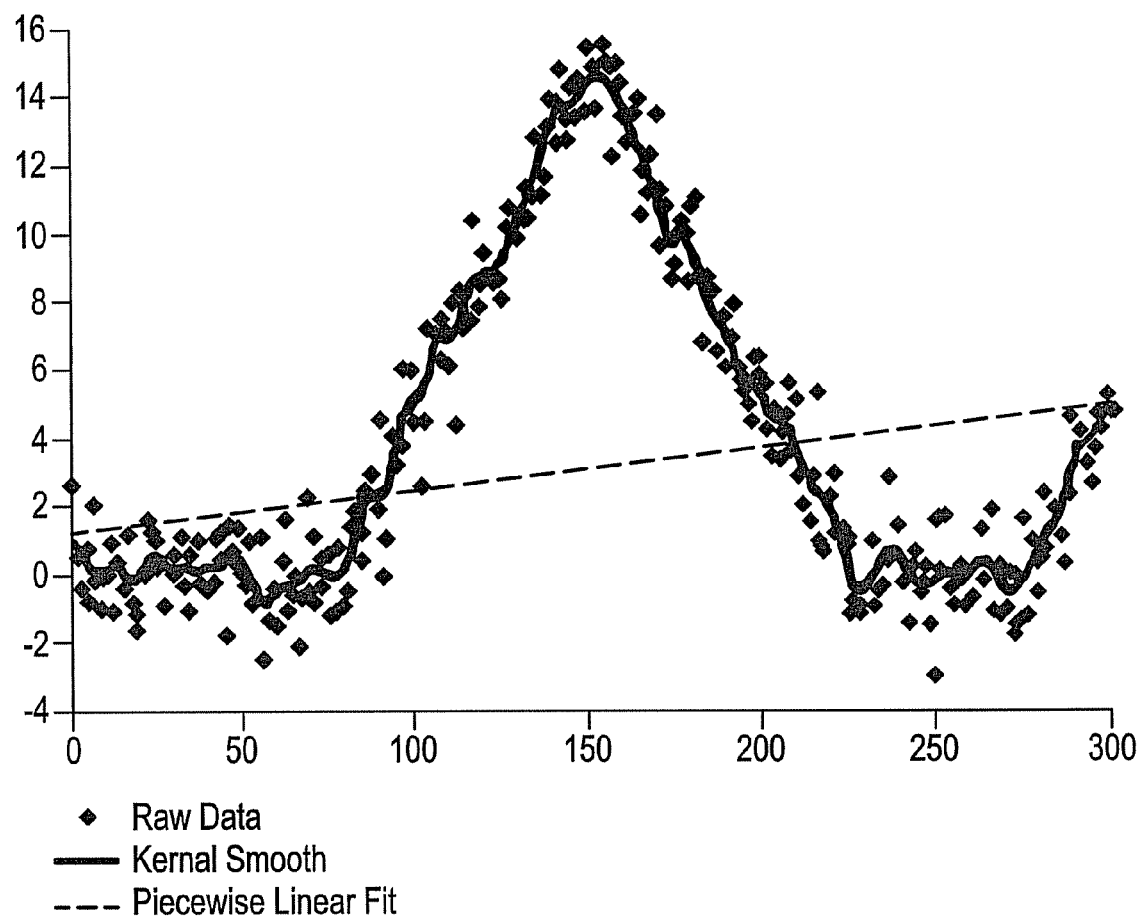
FIG. 7 is a multi-graph showing piecewise linear fit of the splits (top axes) and residuals (bottom axes) of the data shown in FIG. 6.
Figure 7:
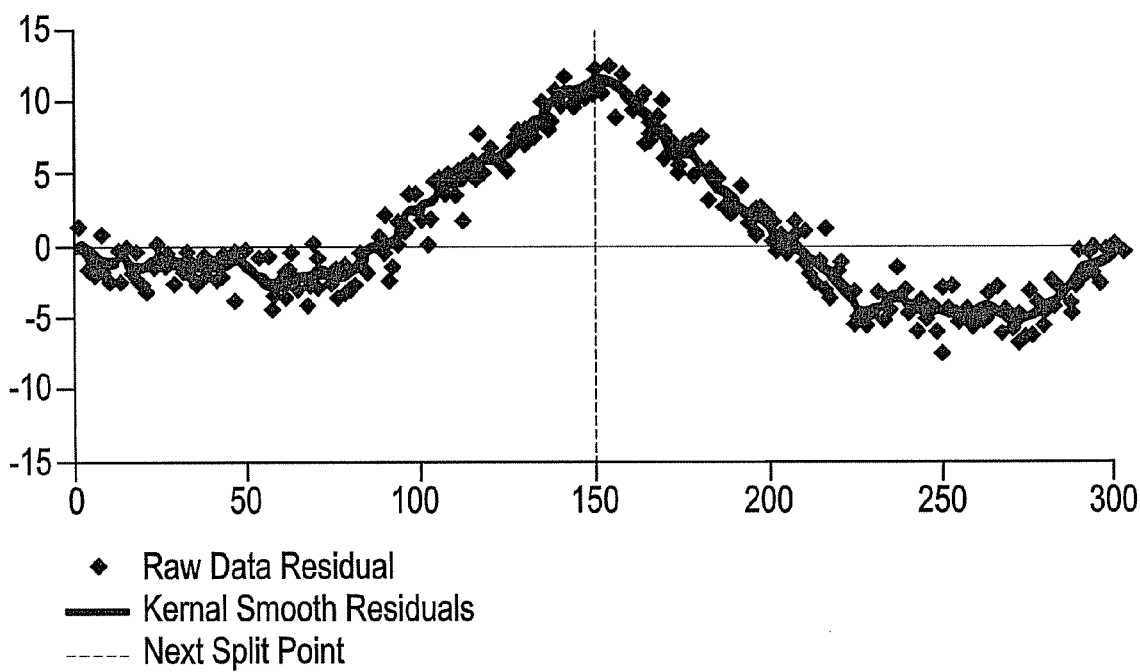
Figure 8A:
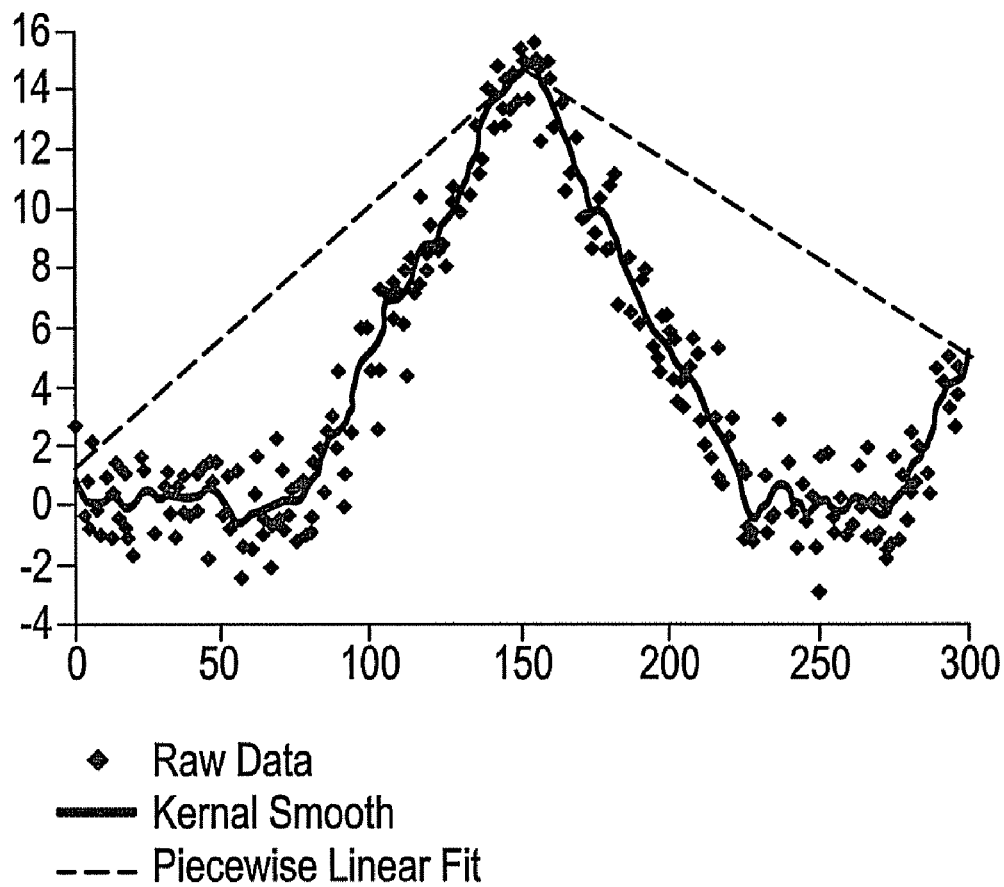
FIG. 8A and FIG. 8B, collectively referred to herein as FIG. 8, are a multi-graph showing iteration two and three of the method described herein for the data shown in FIG. 6, the top axes show new split points added; bottom axes show residuals (of both the smoothed and raw data), and where next split point will be inserted.
Figure 8A:
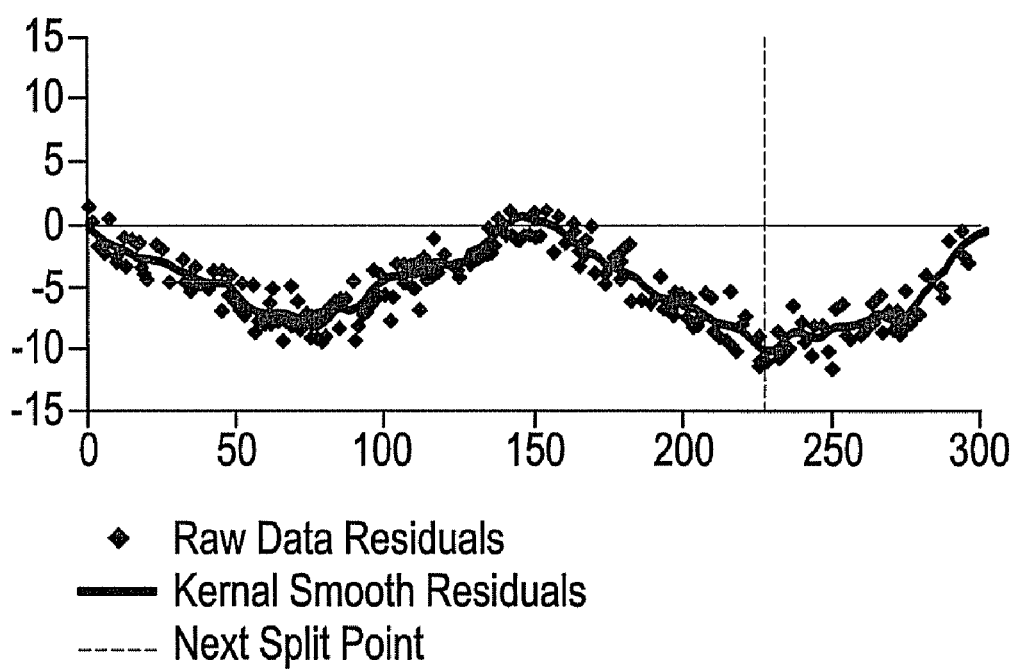
Figure 8B:
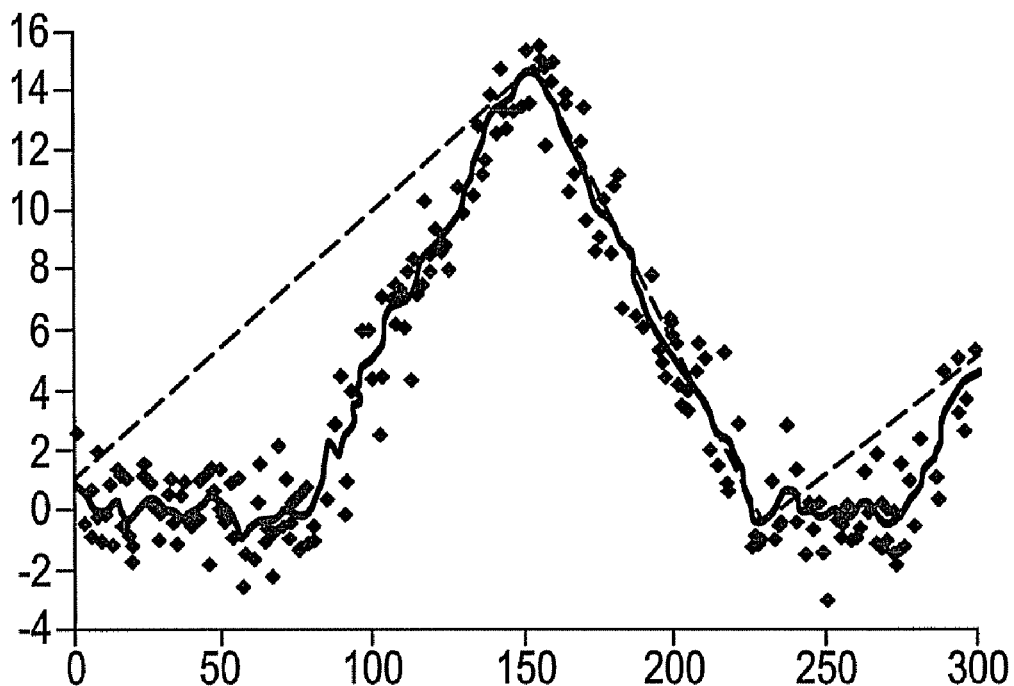
Figure 8B:
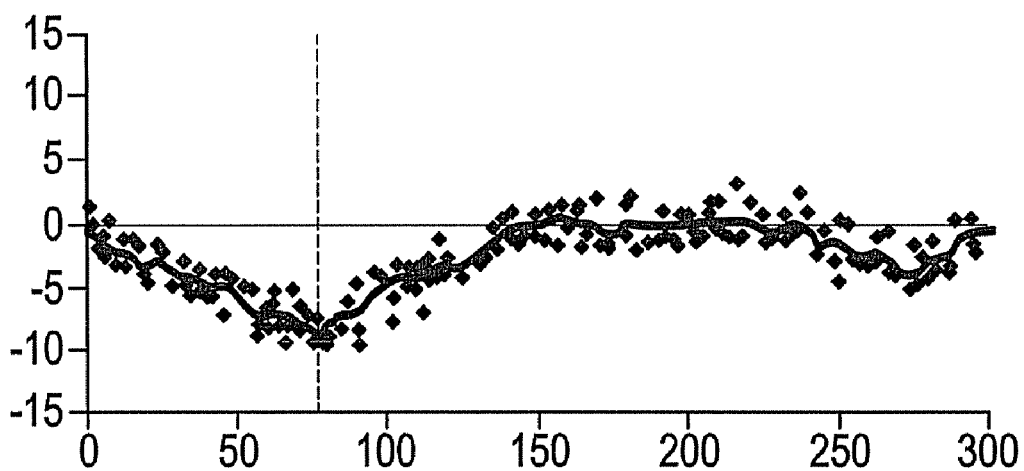
Figure 9A:
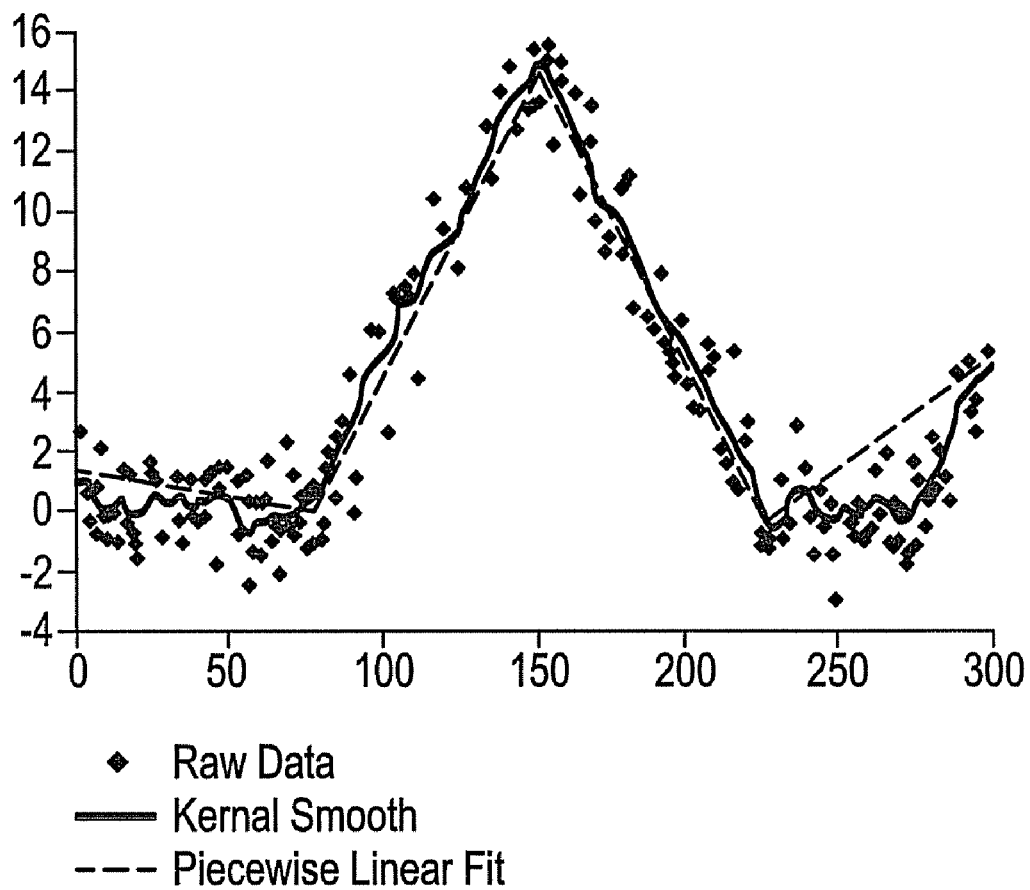
FIG. 9A and FIG. 9B, collectively referred to herein as FIG. 9, are a multi-graph showing iteration four and five of the method described herein for the data shown in FIG. 8, the top axes show new split points added; bottom axes show residuals, and where next split point will be inserted.
Figure 9A:
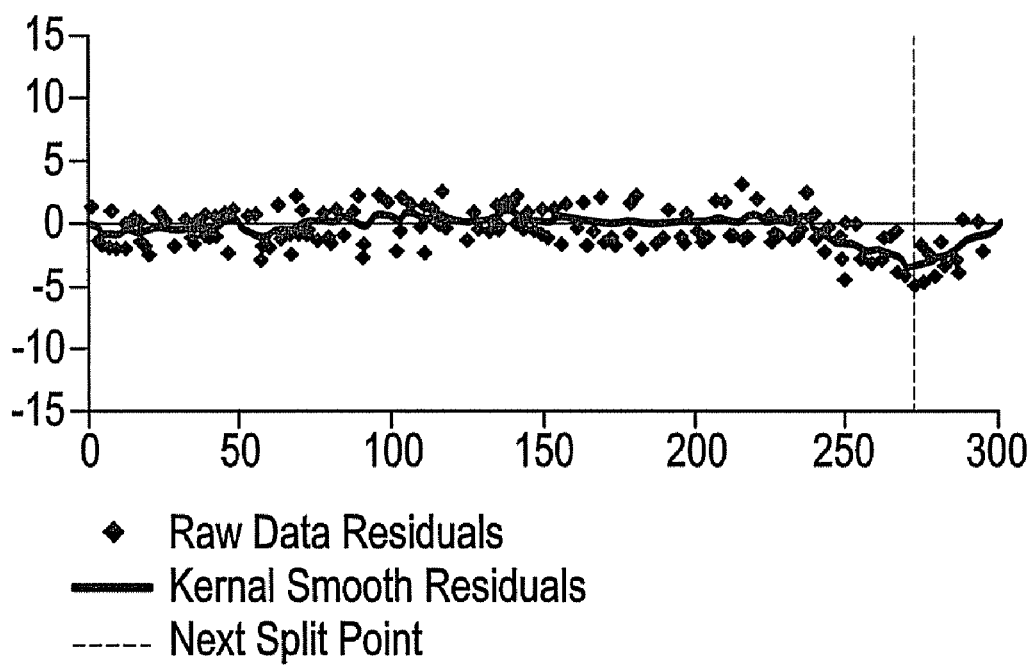
Figure 9B:
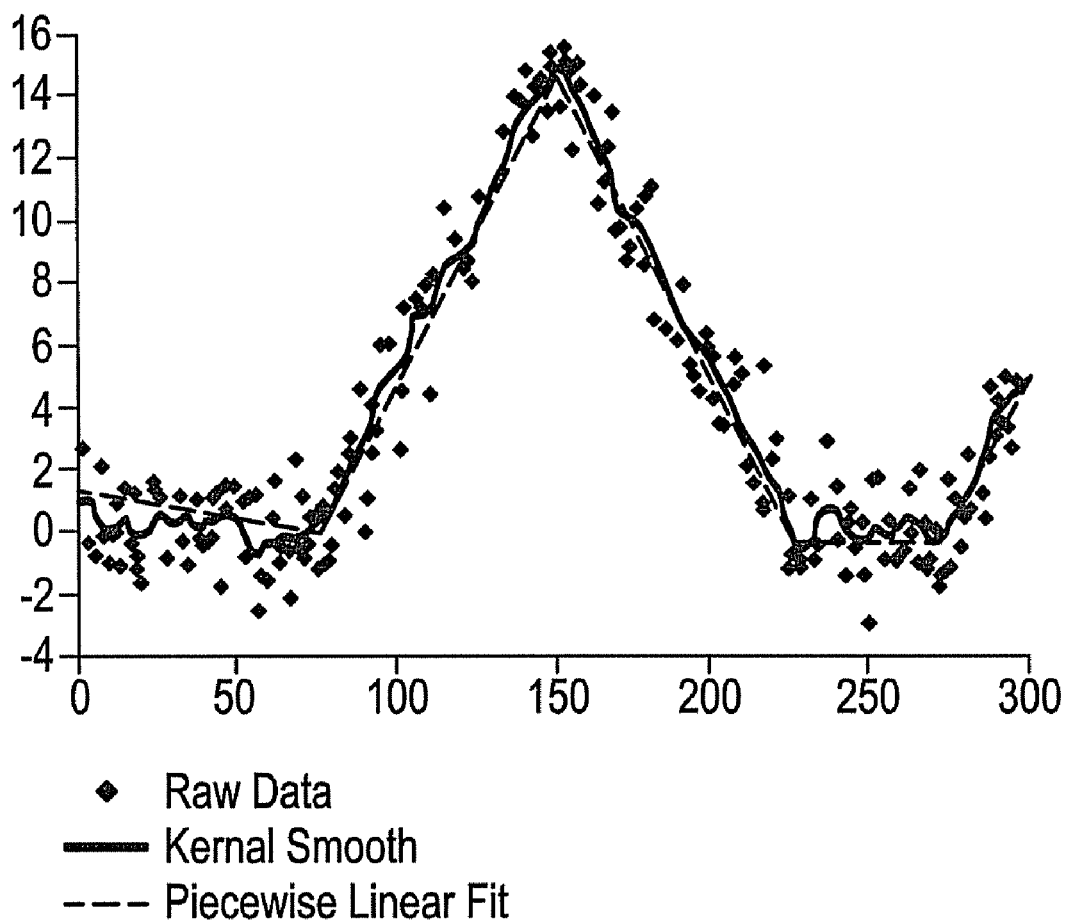
Figure 9B:
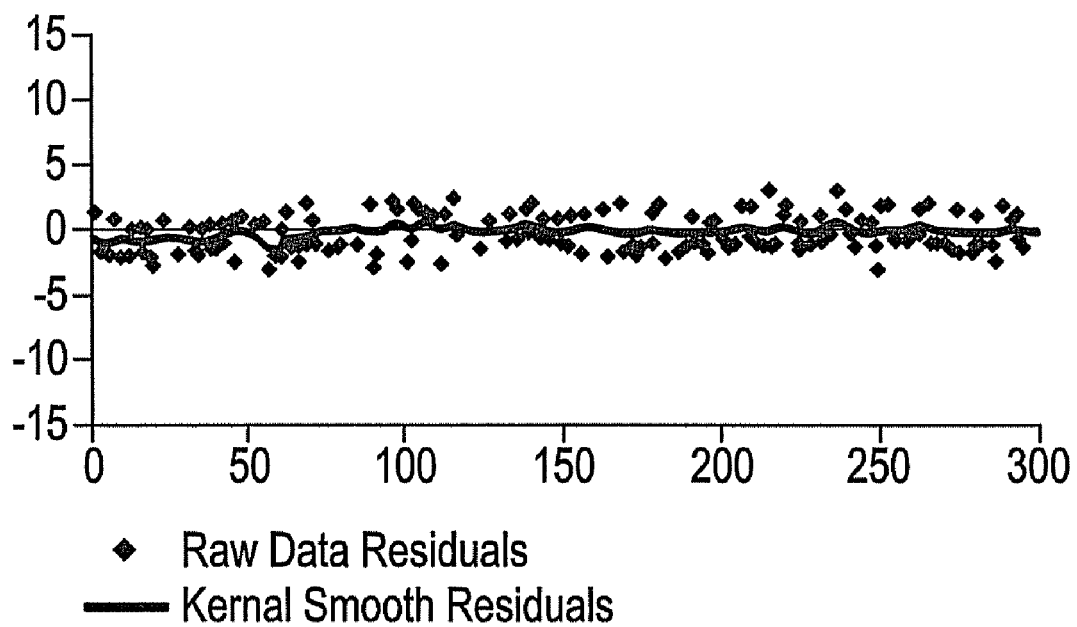

A piecewise linear fit is made between each pair of time ordered split points (FIG. 7, top axes). The residual between the kernel smooth and the piecewise linear fit is calculated (FIG. 7, bottom axes).

Figure 10:
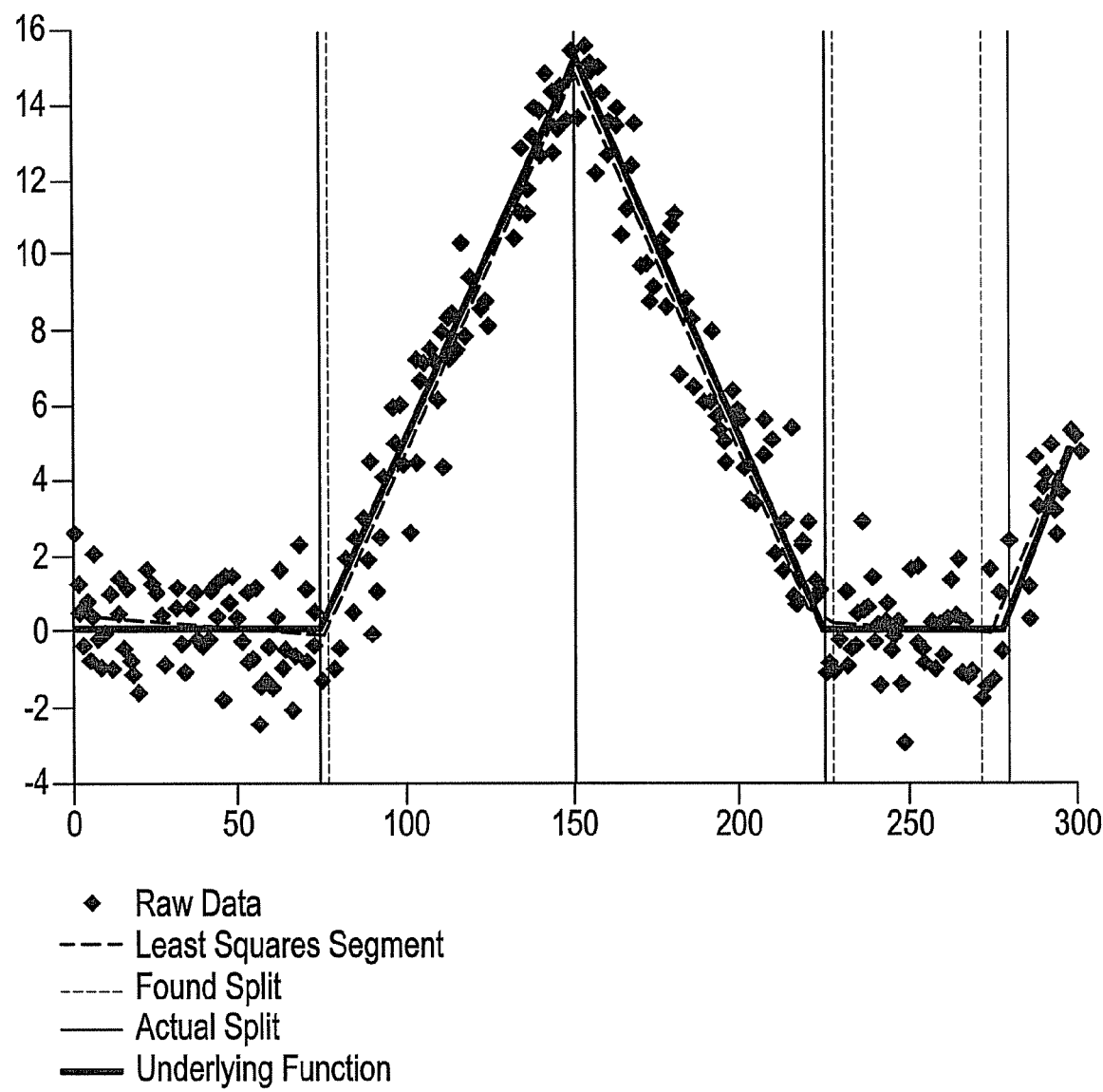
FIG. 10 is a graph showing a summary of split points found by the method described herein and the actual split points. Note that the least-squares fit of the data between splits is a good approximation of the underlying function.

FIG. 8 and FIG. 9 show the algorithm iterating to completion. FIG. 10 is a summary of segments found by the algorithm. There are three things to note in this plot. First, the number of segments found for these data is equal to the true number of segments (five). Second, the linear least-squares fit of the data between splits is a good approximation of the underlying function. Finally, the split points are quite close to the actual time of change. Other algorithms tested tended to identify extra spurious split points, and the resulting segment-wise fit was a poor approximation of the underlying function.

It will be appreciated that the method presented here can be used for fault detection on its own, or for fault detection and localization of the time of fault occurrence for prognostic applications. The method has been successfully applied to several real data sets for both time series data (e.g., aircraft engines) and spatial data (e.g., nondestructive pipeline inspection).

It will be appreciated that real-world data is notoriously contaminated with both noise and outliers (e.g., faulty sensor measurements). The use of kernel regression in accordance with the teachings presented here makes the KSF algorithm robust to noise and outliers. The major reason KSF achieves good performance is that the kernel smoothing diminishes the effect of noise and outliers in the data.

Accordingly, a technical effect of the invention includes a computer program product for performing a method for fault detection and localization. The method includes obtaining a data set; smoothing the data set; identifying a plurality of split points within the data set; and linear fitting a function to the plurality of split points. The method also includes determining a residual between the function and the smoothed data set and determining if any of the residuals exceed a predetermined threshold. If the threshold is exceeded the method includes linear fitting a second function to the plurality of split points and determining the residuals between the second fit and the smoothed data set. The method iteratively continues until the residuals are below a predetermined threshold.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, the split points are where changes in the system may have occurred (e.g., faults, changes in environmental condition, etc.). KSF as described herein might be used directly as a diagnostic system, but may also be employed as a preprocessing and feature extraction step for other diagnostic and prognostic algorithms. For example, KSF might be used to identify potential split points, and features from each segment (between any adjacent split points) might be extracted for further diagnostic processing using any method (e.g., neural networks, random forests, etc.).

For prognostic applications, the ability to localize the point of change (presumably the time of fault onset), can contribute to the estimate of remaining useful life (RUL) by making it both more accurate (i.e., the mean estimate is more likely to correspond with actual RUL) and more precise (i.e., the confidence interval of the estimate is narrower with an accurate estimate of fault onset time).

The deviation of jet engine exhaust gas temperature from a baseline (dEGT) is a closely monitored parameter indicative of engine health. Many common jet engine faults affect dEGT, so detecting and localizing the time of onset of changes in this variable is critical.

Figure 11:
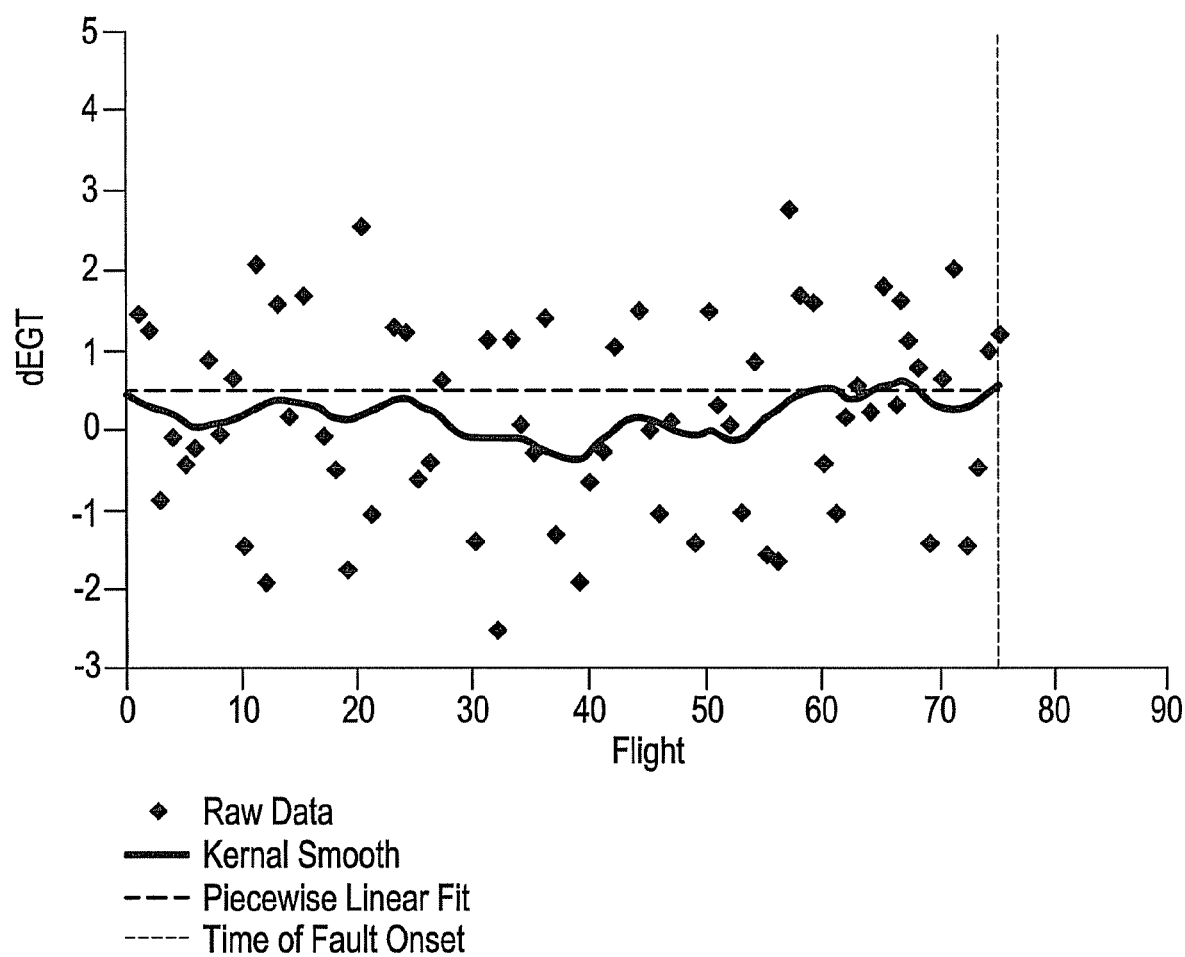
Figure 12:
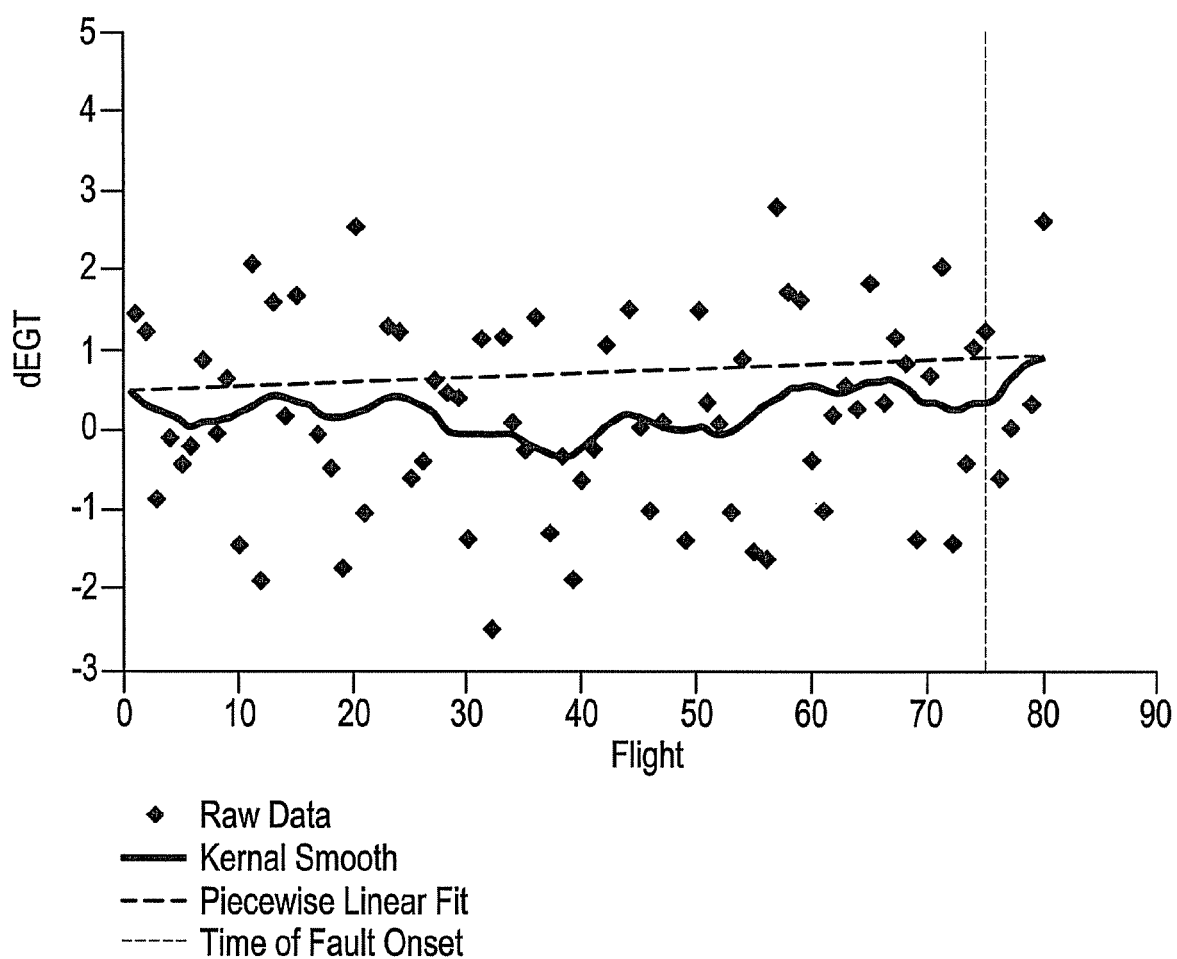

A example of practical use of KSF for diagnosis and prognosis would be the detection and localization of change in a dEGT time series. FIG. 11 is an example of a possible realization of dEGT data. At flight 75, a fault occurs. However, very little change in the data is evident, and KSF considers the time series to be one segment. FIG. 12 is at flight 80, and while there is an increasing trend, the fault is still undetectable by the algorithm. FIG. 13 is at flight 90; by this time (15 flights after the fault occurred) the fault has clearly manifested, and the KSF algorithm has identified two segments: the first segment (flight 1 to 75) of normal operation (dEGT≈0), and the second segment (flight 76 to 90) of abnormal operation with dEGT increasing several degrees, indicating a problem with the engine.

What is claimed is:

1. A method for fault detection and localization, the method comprising:
   electronically obtaining a data set;
   using a fault detection localization module to:
      smooth the data set;
      identify a plurality of split points within the data set;
      fit a piecewise linear function to the plurality of split points; and
      determine a residual between the piecewise linear fit function and the smoothed data set, wherein determining the residual further comprises generating a residual signal.

2. The method as in claim 1 further comprising using the fault detection localization module to:
   determine if the residual exceeds a predetermined threshold, wherein determining if the residual exceeds the predetermined threshold comprises:
   making a second piecewise linear fit to the plurality of split points; and
   determining a second residual between the second piecewise linear fit and the smoothed data set.

3. The method as in claim 1 wherein the data set comprises a time series data set.

4. The method as in claim 1 wherein the data set comprises a spatial data set.

5. The method as in claim 1 wherein obtaining the data set comprises obtaining the data set from a relational database.

6. The method as in claim 1 wherein obtaining the data set comprises obtaining the data set from a magnetic media.

7. The method as in claim 1 wherein obtaining the data set comprises obtaining the data set from at least one real time sensor.

8. A system for fault detection and localization, the system comprising:

a fault detection localization module for analyzing a plurality of data, wherein analyzing the plurality of data includes:
smoothing the data set;
identifying a plurality of split points within the data set;
piecewise linear fitting a function to the plurality of split points;
determining a residual between the function and the smoothed data set, wherein determining the residual further comprises generating a residual signal; and
at least one electronic storage device for storing the plurality of data.

9. The system as in claim 8 further comprising at least one real time sensor.

10. The system as in claim 9 wherein the at least one real time sensor comprises at least one accelerometer.

11. The system as in claim 9 wherein the at least one real time sensor comprises at least one temperature sensor.

12. The system as in claim 9 wherein the at least one real time sensor comprises at least one pressure sensor.

13. The system as in claim 8 wherein the at least one electronic storage device comprises at least one relational database manger system.

14. A program storage device readable by a machine, tangibly embodying a program of instructions executable by the machine to perform a method for fault detection and localization, the method comprising:
electronically obtaining a data set;
smoothing the data set;
identifying a plurality of split points within the data set;
piecewise linear fitting a function to the plurality of split points;
determining a residual between the function and the smoothed data set, wherein determining the residual further comprises generating a residual signal;
determining if the residual exceeds a predetermined threshold, wherein determining the residual exceeds the predetermined threshold comprises:
piecewise linear fitting a second function to the plurality of split points; and
determining a second residual between a second fit and the smoothed data set.

15. The program storage device as in claim 14 wherein the data set comprises a time series data set.

16. The program storage device as in claim 14 wherein the data set comprises a spatial data set.

17. The program storage device as in claim 14 wherein obtaining the data set comprises obtaining the data set from a relational database.

18. The program storage device as in claim 14 wherein obtaining the data set comprises obtaining the data set from a magnetic media.

19. The program storage device as in claim 14 wherein obtaining the data set comprises obtaining the data set from at least one real time sensor.

* * * * *